Oct. 6, 1931.   R. KUHN   1,826,475
ELECTRIC TOASTER
Filed Oct. 22, 1928
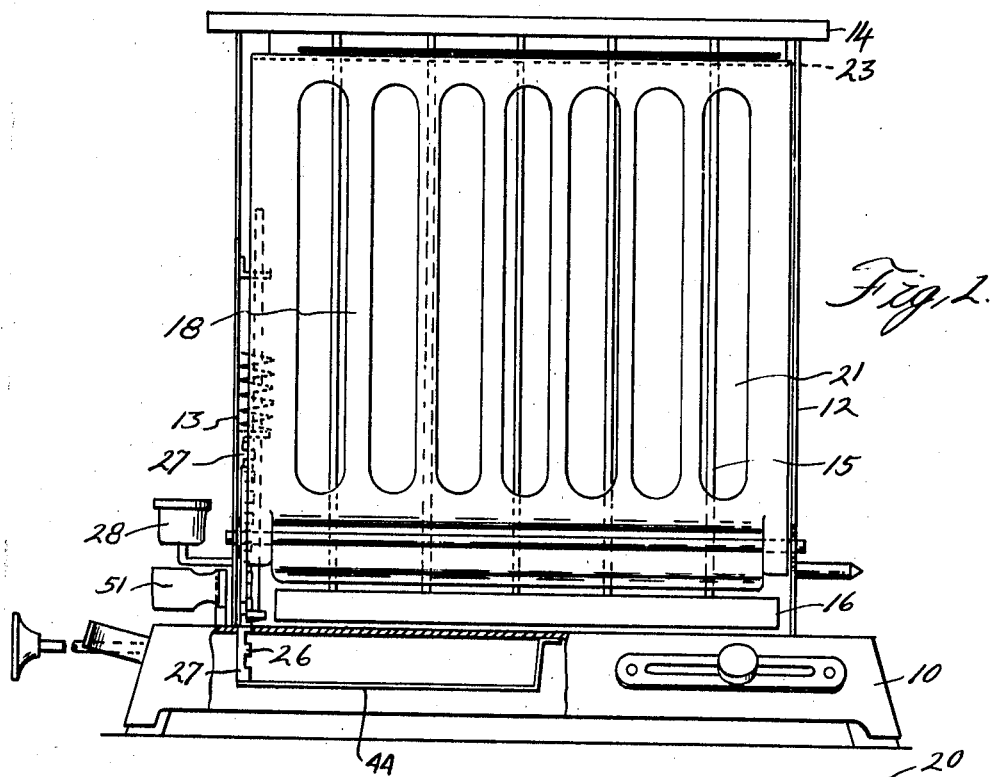
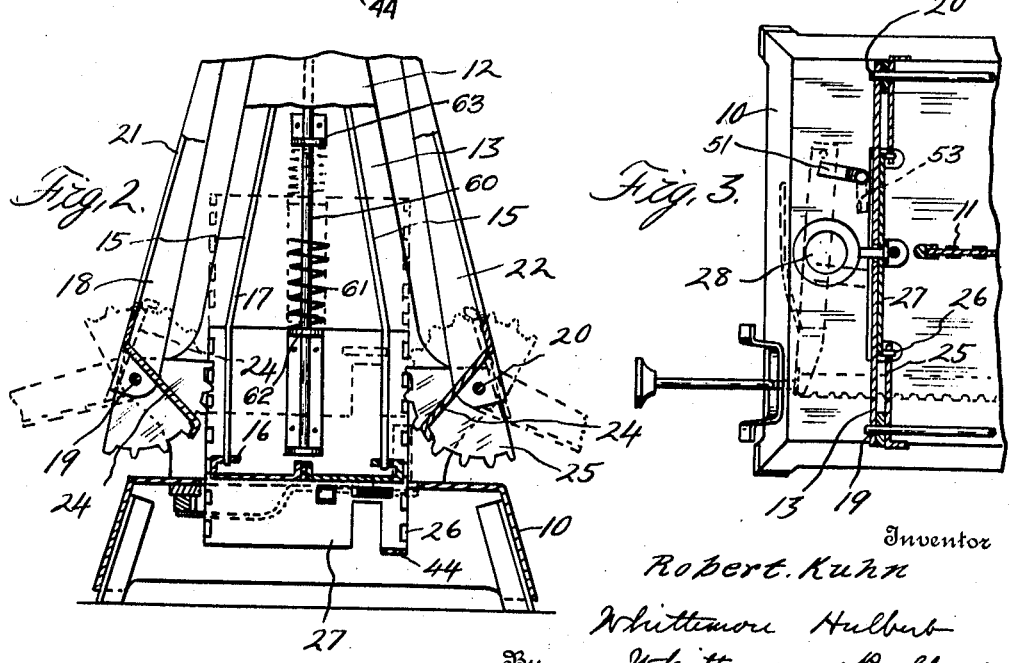

Patented Oct. 6, 1931

1,826,475

UNITED STATES PATENT OFFICE

ROBERT KUHN, OF DETROIT, MICHIGAN, ASSIGNOR TO AMERICAN ELECTRICAL HEATER COMPANY, OF DETROIT, MICHIGAN, A CORPORATION OF MICHIGAN

ELECTRIC TOASTER

Application filed October 22, 1928. Serial No. 314,238.

The invention relates to electric toasters and more particularly to the type wherein the heating element is arranged centrally and pivoted bread holders are provided on opposite sides thereof, movable from a loading position where they are approximately horizontal to a toasting position where they are inclined inwardly from the vertical.

The primary object of the invention is to provide an improved construction for manually operating the two bread holders simultaneously from inactive to toasting position.

Another object consists in the provision of a construction adapted particularly for manual closing and for automatic opening after a predetermined time interval.

These and other objects are attained by providing the novel construction hereinafter more fully described and illustrated in the accompanying drawings, wherein Figure 1 is a side elevation of a toaster provided with my invention;

Figure 2 is a transverse section therethrough;

Figure 3 is a horizontal sectional view through one end of the toaster.

Referring now to the construction illustrated, the electric toaster consists of a base 10 carrying the vertical heating element 11 which is arranged centrally thereof between end plates 12 and 13 which in turn carry an upper horizontal platform 14. On either side of the heating element 11 are arranged a series of rods or wires 15 against which the slices of bread are adapted to rest when in toasting position. These rods or wires are supported in brackets 16 on the base 10 and extend vertically upward for a short distance and are then inclined inwardly as indicated at 17 so that the slices when resting against the rods are held in position by gravity. The bread holders 18 in the construction illustrated are hingedly secured to the end plates 12 and 13 to pivot about the points 19 and 20. Each bread holder has the open-work back portion 21, side flanges 22 and an upper end flange 23. They also have the inwardly projecting bottom flange 24 arranged at an obtuse angle to the back 21 in such a manner that when the bread holder is moved to open position, the bottom of the slice will be engaged by the portion 24 and moved outward thereby causing the slice to slide downward into the bread holder with the previously toasted side engaging the bottom 21 of the holder. By reason of this construction the slice is automatically reversed each time the bread holder is moved from toasting position to the open position. As illustrated in dotted lines in Figure 2, the bread holder when in open position inclines downwardly below the horizontal plane and, on the other hand, when the bread holder is in toasting position, it is inclined inwardly beyond the vertical plane thus making the total angular movement from open to closed position over 90°.

One of the features of the present invention is the provision of a construction for simultaneously operating the bread holders through an angular movement greater than 90° and carrying out this movement I have utilized a novel construction as hereinafter more fully set forth.

Each bread holder is provided with a tooth segment 25 engageable with rack teeth 26 on opposite sides of a vertically movable slide 27. A handle 28 projects outwardly beyond the end plate 13 through a suitable slot and is secured to the slide 27. The arrangement is such that when the handle 28 is depressed the slide 27 is moved downwardly causing the rack teeth 26 to rotate the segments 25 and move the bread holders 18 into toasting position. A spring 44 on the underside of the base 10 bears upwardly against the slide 27, thus urging the bread holders to open position. For maintaining the bread holders in operative position any suitable mechanism may be provided and as shown this is a manually operable device consisting of a pivoted handle 51 having an arm 53 engageable with a recess 54 in the slide 27.

Adjacent one end plate of the toaster is arranged a vertical rod 60, surrounding which there is a coil spring 61. The slide 27 has a bracket 62 extending therefrom surrounding the rod 60 and forming an abutment for the spring 61. 63 is another bracket fixed to the end plate of the toaster and serving as the opposite abutment for the spring. The spring therefore serves as a buffer preventing undue shock when the bread holders fall to open position by gravity action. In this movement the slide 27 moves upwardly, thus compressing the spring between the brackets 62 and 63.

In the operation of the toaster as above described, the handle 28 is depressed thus moving the slide 27 downwardly and simultaneously rotating the segments 25 until both toast holders are in operative relation to the heating element. To counteract the spring 44 the handle 51 is operated to cause the arm 53 to engage recess 54 in the slide 27, thus holding the toast holders in operative position. When the toast is finished the holders may be manually released by operating handle 51. The spring 44 thereupon moves the slide 27 upwardly and imparts an outward motion to the toast holders. When the holders pass the vertical position they will be acted upon by gravity and fall to the downward position. Before reaching this position the spring 61 is compressed between the brackets 62 and 63 thereby cushioning the shock. It will be observed that with the construction as described above, I have provided means for simultaneously operating the toast holders without employing links.

What I claim as my invention is:

1. A toaster comprising a frame, a pair of toast holders hinged to said frame, gear segments secured to each toast holder, a slide on said frame engaging said gear segments and manually operable means for moving said slide thereby simultaneously adjusting said toast holders.

2. A toaster comprising a base, a vertical heating element above said base, a pair of hinged toast holders on opposite sides of said element, gear segments on each of said toast holders, a vertically slidable plate mounted on said frame and having rack teeth engaging the respective gear segments and means for vertically moving said slidable plate.

3. A toaster comprising a base, a vertical heating element above said base, a pair of hinged toast holders on opposite sides of said element, gear segments on each of said toast holders, a vertically slidable plate mounted on said frame and having rack teeth engaging the respective gear segments, a spring normally urging said plate in an upward direction and a resilient buffer operable by the upward movement of said plate.

4. In a toaster, a pair of shafts, toast holders rockably mounted on said shafts, gear segments on said toast holders, and a rack slidable between said shafts and transversely of the axes thereof engaging said gear segments for rocking said toast holders on said shafts.

5. In a toaster, a vertical heating element, horizontally arranged shafts on opposite sides of said heating element, toast holders rockably mounted on said shafts, gear segments on said toast holders, and a rack movable longitudinally in substantially a vertical plane between said shafts and engaging said gear segments for rocking said toast holders about said shafts.

6. In a toaster, a vertical heating element, horizontally arranged shafts on opposite sides of said heating element, toast holders rockably mounted on said shafts for movement toward and away from said heating element, gear segments on said toast holders, and a vertically slidable plate arranged between said toast holders and having rack-teeth engaging the respective gear segments for rocking said toast holders toward and away from said heating element.

7. In a toaster, a toast holder movable to toasting and non-toasting positions, a gear segment on said toast holder, a rack engaging said gear segment for moving said toast holder to either of said positions, means urging said toast holder to non-toasting position, and means for locking said toast holder in toasting position.

8. In a toaster, a toast holder movable to toasting and non-toasting positions, a gear segment on said toast holder, a rack engaging said gear segment for moving said toast holder to either of said positions, a spring engaging said rack for urging said toast holder to non-toasting position, and means engageable with said rack for locking said toast holder in toasting position.

9. In a toaster, a heating element, a toast holder movable toward and away from said heating element, a gear segment on said toast holder, a rack engageable with said gear segment for moving said toast holder, a spring for moving said rack in one direction, and means engageable with said rack for locking the same against movement by said spring.

10. In a toaster, a frame, a pair of pivotally mounted toast holders on the frame, tooth elements connected to said toast holders, and actuating means for said holders, including means engaging the tooth elements and movable longitudinally in substantially a vertical plane.

11. In a toaster, a frame, a pair of hinged toast holders on said frame, tooth elements rigid with the holders, and actuating means for said holders, including a rack engaging said tooth elements and movable longitudinally in substantially a vertical plane, and an operating member connected to the rack.

12. In a toaster, a frame, a pivotally mounted toast holder on the frame, a member movable longitudinally in substantially a vertical plane, and a connection between said member and holders operable upon longitudinal movement of said member to swing said holder upon its pivot, including a part carried by the holder, and means carried by the member engageable directly with said part.

13. In a toaster, a frame, a pivotally mounted toast holder on said frame, and actuating means for said holder including a gear segment connected to the holder, and a sliding rack engaging the gear segment.

14. In a toaster, a frame, a pivotally mounted toast holder on said frame, a rack slidable longitudinally in substantially a vertical plane, and an operating connection between the rack and holder including a part projecting from the holder and engageable directly with the rack.

15. In a toaster, a frame, a pivotally mounted toast holder on said frame, and actuating means for the holder including a longitudinally movable member, and means rigid with the holder and substantially concentric with its pivot engageable directly with the longitudinally movable member.

In testimony whereof I affix my signature.

ROBERT KUHN.